No. 753,082. PATENTED FEB. 23, 1904.
C. LEDERMAN.
PACKAGE CARRIER.
APPLICATION FILED JULY 21, 1903.
NO MODEL.

Witnesses
Ralph A. Shepard
H. J. Shepard

Inventor
Charles Lederman
by C. C. Shepherd
Attorney.

No. 753,082. Patented February 23, 1904.

UNITED STATES PATENT OFFICE.

CHARLES LEDERMAN, OF COLUMBUS, OHIO.

PACKAGE-CARRIER.

SPECIFICATION forming part of Letters Patent No. 753,082, dated February 23, 1904.

Application filed July 21, 1903. Serial No. 166,491. (No model.)

*To all whom it may concern:*

Be it known that I, CHARLES LEDERMAN, a citizen of the United States, residing at Columbus, in the county of Franklin and State of Ohio, have invented a certain new and useful Improvement in Package-Carriers, of which the following is a specification.

This invention relates to means for carrying packages upon bicycles, and has for its object to provide an improved device of this character which may be readily applied and removed without requiring any change or alteration in the bicycle and when in position for use does not interfere with the usual manipulation of the machine. It is furthermore designed to provide for conveniently separating the several parts of the device for convenience in storage when not applied to a bicycle and also to arrange for folding the device while on the bicycle and not in use to support a package.

In a specific aspect of the invention it is designed to hang the device from the handlebar and to brace the device from the head or steering tube of the bicycle in such a manner as not to interfere with the proper manipulation of the handle-bars in steering the bicycle.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
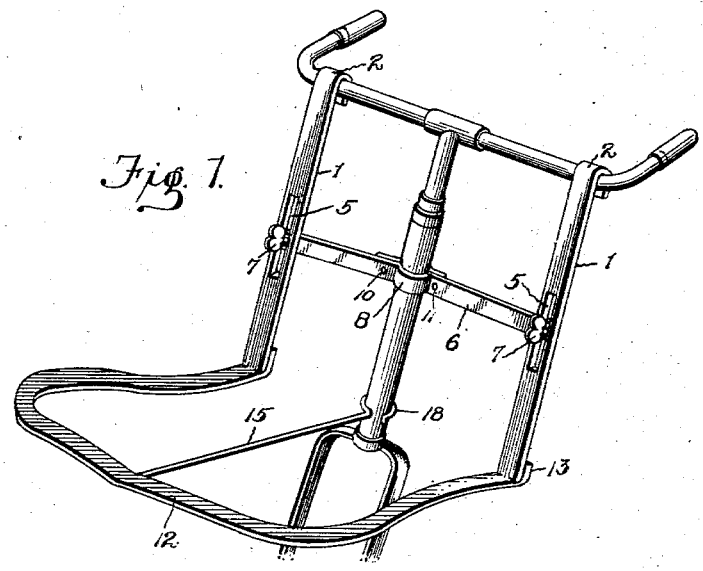
Figure 2:
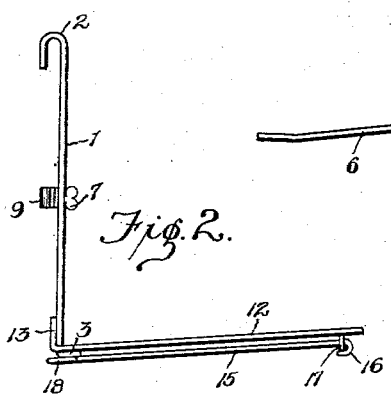
Figure 3:
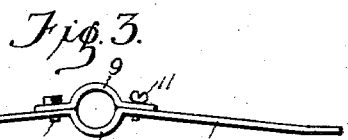
Figure 4:
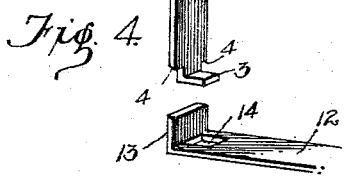

In the drawings, Figure 1 is a perspective view of a bicycle package-carrier embodying the features of the present invention and shown in applied position. Fig. 2 is a side elevation of the device. Fig. 3 is a detail plan view of the cross-brace for connecting the hanger members. Fig. 4 is a detail perspective view illustrating the form of connection between the base-frame and one of the hangers.

Like characters of reference designate corresponding parts in each and every figure of the drawings.

In the embodiment of the present invention, as shown in the accompanying drawings, 1 designates a pair of hanger members, which are duplicates in form, each having its upper end bent into a hook 2 to take over a handlebar, as shown in Fig. 1. The lower end of each hanger is provided with a reduced laterally-projected terminal 3, forming a substantially L-shaped hook, with shoulders 4 at opposite sides thereof. A longitudinal slot 5 is formed immediately of each hanger member.

To connect the hanger members there is a cross-bar 6, which has its opposite terminals applied to the backs of the hanger members and provided with screw-threaded openings or sockets for the reception of thumb-screws 7, which pass through the slots 5 for the purpose of detachably connecting the cross-bar to the hangers and to permit adjustment of the bar upon the hangers. At the middle of the cross-bar there is a bend or kink 8 to form a seat to receive the head-tube of a bicycle, as shown in Fig. 1. Extending across the open rear side of the seat 8 is a clamp member 9, bowed intermediately to embrace the rear side of a head-tube pivotally connected at one end to the cross-bar, as at 10, and provided with an adjusting-screw 11, piercing the opposite end of the clamp member and the cross-bar to detachably connect the free end of the clamp thereto. By reference more particularly to Fig. 3 of the drawings it will be seen that the opposite portion of the cross-bar 6 inclines forwardly from the bend of seat 8, so that when the cross-bar is secured to the hangers 1 the front of the seat will lie in substantially the same plane with the front faces of the hangers.

Supported upon the lower ends of the hangers is a base in the form of a substantially U-shaped frame 12, the free terminals of which are turned up to form upstanding lugs or shoulders 13, with openings 14 formed in front of the lugs. The L-shaped terminals 3 of the hangers are received through the respective openings 14 with the lateral tongues lying flat against the under side of the frame and the shoulders 4 upon the top of the frame, whereby the latter is supported upon the hangers at substantially right angles thereto. As best indicated in Fig. 2, it will be seen that the tongues 3 are set so as to support the frame at an acute angle to the hangers, so as to have the frame inclined downwardly and rearwardly, and thereby more effectually support bundles and packages thereon. When not in use, the frame or base may be folded up against the hangers upon the hinged connection between the frame and hangers.

For the support of the forward end of the base-frame 12 there is a brace 15, which has its forward end bent into an upstanding hook 16 to engage a perforate lug or ear 17, pendent from the under side of the base, while the rear end of the brace-rod is formed into a substantially horizontal spring hook or clamp 18 to embrace a head-tube and thereby brace the base-frame 12 from the frame of the bicycle.

Having thus described the invention, what is claimed, and desired to be secured by Letters Patent, is—

1. A device of the character described embodying a pair of hangers, a base-frame supported upon the hangers and disposed at an angle thereto, a cross-brace connected to the hangers and having an intermediate bend to form a seat for partially embracing the head-tube of a bicycle, a detachable clamp member having an intermediate bend to close the open side of the seat and pivotally connected at one end to the cross-bar, and an adjusting-screw piercing the other end of the clamp member and the cross-bar.

2. A device of the character described embodying opposite hangers, a base-frame supported upon the hangers and disposed at an angle thereto, and a cross-brace having its opposite ends adjustable vertically upon the hangers and provided with an intermediate seat for the reception of the head-tube of a bicycle.

3. A device of the character described embodying a pair of hangers having intermediate longitudinal slots, a base-frame supported upon the hangers and disposed at an angle thereto below the slots, a cross-brace extending between the hangers and provided with an intermediate seat for the reception of the head-tube of a bicycle, and adjusting-screws piercing the respective slots and engaging the cross-brace to adjustably connect the same to the hangers.

4. A device of the character described embodying a pair of hangers having their lower ends terminating in hooks, and a base-frame having openings for the reception of the hangers and also provided with upstanding projections in rear of the openings to lie against the backs of the hangers to form a detachable and hinged connection between the base-frame and the hangers.

5. A device of the character described embodying a pair of hangers having reduced lower terminals directed laterally to form hooks, and a substantially U-shaped base-frame having its opposite ends provided with upstanding lugs and openings formed in front of the lugs for the reception of the hooks of the hangers.

6. A device of the character described embodying a hanger, a base-frame supported upon the hanger and at an angle thereto, and a brace carried by the frame independently of the hangers and provided with means for engagement with the head-tube of a bicycle.

7. A device of the character described embodying a hanger, a base-frame carried by and disposed at an angle to the hanger, and a brace carried by the frame and provided with a spring-clamp to embrace the head-tube of a bicycle.

8. A device of the character described embodying a pair of hangers, a substantially U-shaped base-frame having its opposite ends connected to the hangers and disposed at an angle thereto, and a brace-bar projected rearwardly from an intermediate portion of the base-frame and provided at its rear end with a spring-hook to embrace the head-tube of a bicycle.

CHARLES LEDERMAN.

In presence of—
C. C. SHEPHERD,
W. L. MORROW.